Sept. 17, 1935.          F. O. CARLSON                2,014,375
                           RULER TAPE
                   Filed March 13, 1931      2 Sheets-Sheet 1
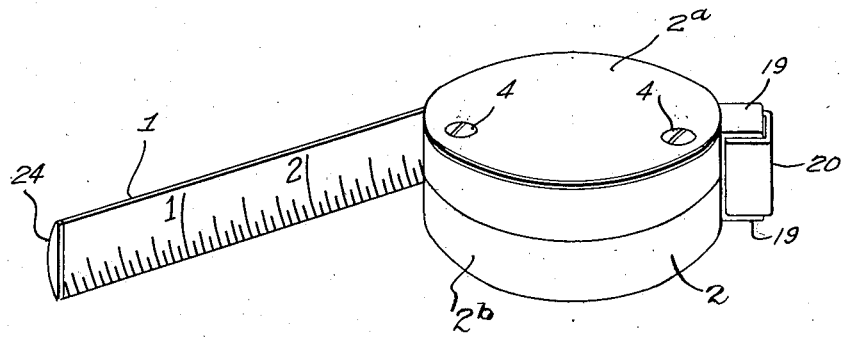
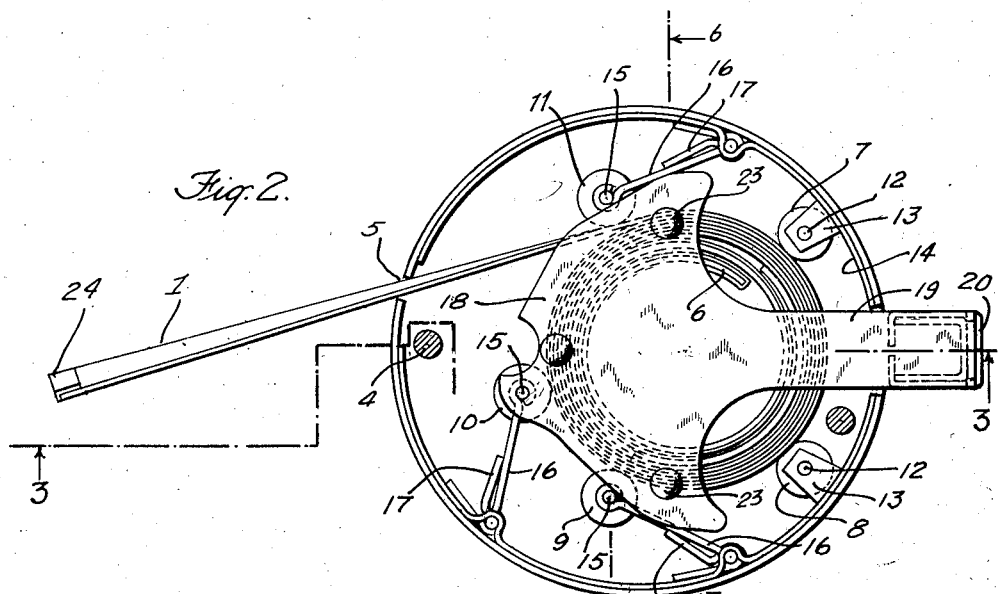
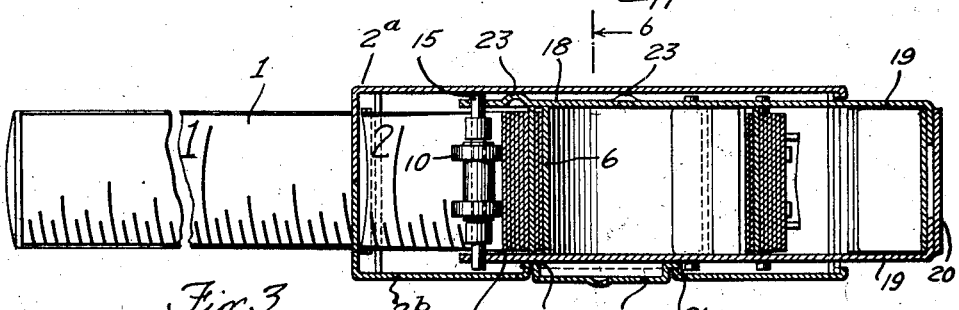
INVENTOR
Frederick O. Carlson
BY Janney, Blair & Curtis
ATTORNEYS Sept. 17, 1935.　　　F. O. CARLSON　　　2,014,375
RULER TAPE
Filed March 13, 1931　　　2 Sheets-Sheet 2
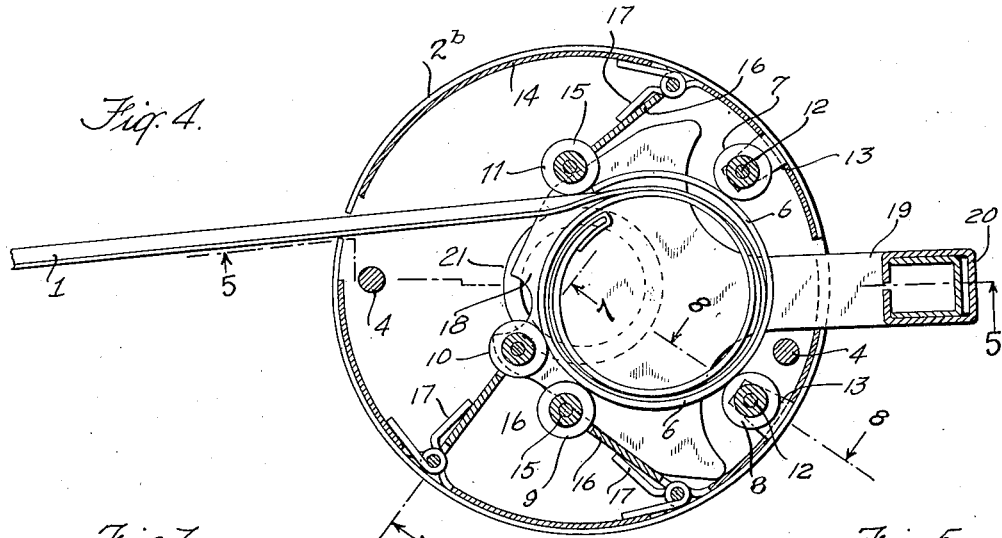
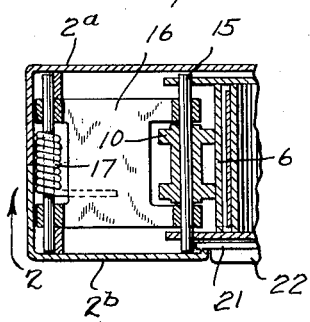
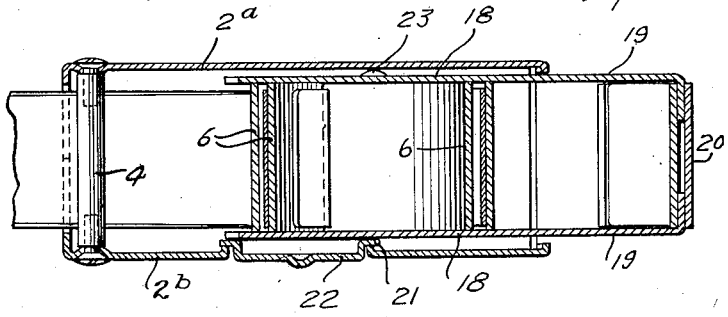
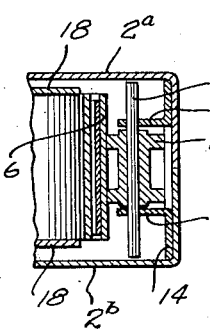
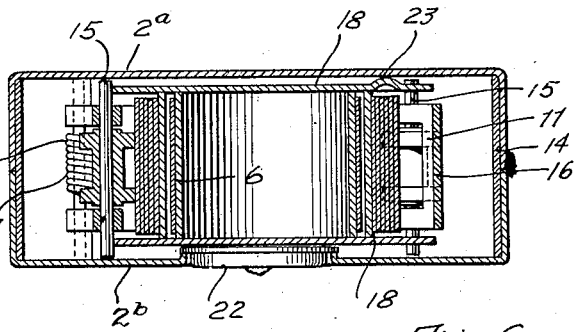
INVENTOR
Frederick O. Carlson
BY Janney, Blair & Curtis
ATTORNEYS Patented Sept. 17, 1935

2,014,375

UNITED STATES PATENT OFFICE 2,014,375

RULER TAPE

Frederick O. Carlson, Shelburne Falls, Mass.

Application March 13, 1931, Serial No. 522,316

8 Claims. (Cl. 33—138)

This invention relates to ruler tapes and particularly to ruler tapes having a tendency and the capacity, when coiled, to uncoil and assume a straight line formation, and holders therefor.

It is an object of the invention to provide an efficient holder for such a tape in which the tape may be readily coiled, and confined when not in use.

It is a further object to provide a holder from which such a tape may be readily withdrawn or projected.

In the drawings:—

Figure 1 is a perspective view of a holder and ruler tape embodying the invention.

Fig. 2 is an enlarged top plan view of the same with the cover removed and showing a substantial portion of the tape coiled within the holder.

Fig. 3 is a section on the line 3—3 of Fig. 2.

Fig. 4 is the same as Fig. 2 with the upper cam plate removed and showing the position of the parts when the tape is withdrawn from the holder to the limit of its outward travel.

Fig. 5 is a section on the line 5—5 of Fig. 4.

Fig. 6 is a section on the line 6—6 of Fig. 2.

Fig. 7 is a section on the line 7—7 of Fig. 4.

Fig. 8 is a section on the line 8—8 of Fig. 4.

Referring to Fig. 1, the ruler tape, which is designated 1, is preferably made of tempered steel and is concavo-convex in cross-section to give it the tendency and capacity when coiled, to uncoil and assume a straight line formation.

The illustrative holder 2, which is cylindrical in form, consists of an upper section 2a and a lower section 2b held together by screw bolts 4. As shown in Fig. 2, the tape enters the holder through a guide opening 5 provided in the side wall of the holder. The inner end of the tape is secured to a drum member 6 about which the tape is coiled and confined.

The tape is confined in coiled formation on the drum 6 by a series of rollers 7, 8, 9, 10 and 11, which are arranged to bear against the outer convolution of the coil with sufficient pressure to hold the tape against self-projection from the holder while permitting a ready pushing or pulling of the tape into or out of the holder, as the case may be.

Rollers 7 and 8 are rotatably mounted on spindles 12 carried by supports 13 extending inwardly from a liner 14 secured to or held in contact with the inner side wall of the holder as for example by solder or the like. Rollers 9, 10 and 11 are rotatably mounted on spindles 15 carried by arms 16 pivoted to liner 14. Arms 16 are yieldingly pressed toward drum 6 and the coiled tape by springs 17. It should be noted that the drum 6 is not secured to any part of the holder and is free to shift its position within the confines of the rollers 7, 8, 9, 10, and 11. It should be noted also that rollers 7 and 8 have a fixed radial position, while rollers 9, 10, and 11 may move toward and from the coiled tape and are spring pressed toward the tape and toward rollers 7 and 8. Thus the coiled tape is held in contact with the rollers 7 and 8 by the pressure of the rollers 9, 10, and 11 while the drum 6 is free to shift toward or from rollers 7 and 8 as the diameter of the coil decreases or increases. This arrangement facilitates the coiling and uncoiling of the tape about the drum, as the drum and coil are permitted to shift their position in response to pressures and thus assist in equalizing the pressure of the several rollers on the coiled tape.

The holder as thus far described may be used with the tape to provide a ruler of the "push-pull" type, i. e., a ruler in which the tape is manually pushed into and pulled out of the holder. When so used the drum 6 and the tape coiled thereabout are confined against movement axially of said casing by the upper and lower walls of the holder, and said tape is at all times confined about the drum by the yielding pressure with which the releasable rollers 9, 10, and 11 hold the tape and drum against the rollers 7 and 8 mounted on the fixed spindles 12. The rollers 7, 8, 9, 10, and 11 are substantially non-frictionally mounted on their respective spindles, and permit the rotation of the drum 6 with the tape coiled thereon to coil or uncoil the tape, the yielding pressure of the rollers 9, 10, and 11 creating sufficient friction between the tape and the holder to prevent the automatic projection of the tape from the holder when the rollers 9, 10, and 11 are in their unreleased position. As the diameter of the coil about the drum expands and contracts in response to the increase or decrease in the number of convolutions in the coil, the yielding pressures of the rollers 9, 10, and 11 permit a shifting of the rollers.

As above indicated, when the yielding pressure, which the rollers 9, 10 and 11 exert on the coiled tape is released, the friction between the tape and the holder is reduced to the extent that the tape and drum are substantially anti-frictionally mounted in the holder, the rollers 7, 8, 9, 10, and 11 acting to effect this anti-frictional mounting.

In order to accomplish the release of the rollers 9, 10, and 11, and consequently reduce the friction existing between the coil and the holder, whereby the tape is permitted to project itself out of the holder through the guide opening 5, I provide cam plates 18 constructed and arranged to counteract the pressure on the springs 17, and to move the rollers 9, 10, and 11 away from the coiled tape. The movement of the cam plates 18 with respect to the holder 2 is guided by extensions 19 which extend through the holder 2, and at the other end by the spindle 15 which is mounted between the plates, and which is in turn mounted on an arm 16 pivoted to the liner 14.

As shown in Fig. 2, each plate 18 is formed to engage spindles 15 and move the spindles and the rollers carried thereby away from the coil when the plate is moved to the left in Fig. 2. As shown in Fig. 3, two such cam plates are provided, one above and one below the coil. Each plate is provided with an extension 19 which extends outside the holder through an opening formed in the side wall of the holder. Extensions 19 of the plates 18 are secured to a push button 20 which may be pushed by the operator to move plates 18 and thereby move rollers 9, 10, and 11 away from the coil. Springs 17 return plates 18 to initial position when the pressure on button 20 is released.

Still referring to Fig. 3, lower plate 18 rests upon a flange 21 of a button 22 which extends through an opening formed in the bottom wall of the holder. Flange 21 by contact with the bottom wall of the holder prevents the button 22 from dropping through the opening in the bottom wall, and also holds the plate 18 in raised position relative to the bottom wall of the holder to facilitate its movement in response to pressure on the button 20. Upper plate 18 is provided on its upper surface with raised portions 23 to hold the plate in spaced relationship to the top of the holder and to reduce frictional contact between the plate and the top of the holder.

When cam plates 18 are employed to provide a self-projecting ruler, the drum 6 lies between the two plates 18. Pressure on button 22 will move lower plate 18 toward upper plate 18 and thereby retard or stop rotation of the drum 6. As the height of the drum is slightly greater than the height of the coiled tape, this braking means permits the operator to take up slack in the coil, by pressing the button 22 to prevent rotation of drum 6 and then pulling outwardly on the tape to tighten it about the drum.

A guard 24 may be provided on the outer end of the tape to prevent the outer end of the tape from passing into the holder through the opening 5 and to assist in pulling the tape out of the holder in the "push-pull" type of ruler.

In operation, and starting with the parts in the position shown in Fig. 4, the operator holds the holder in one hand and with the other hand pushes the tape into the holder through guide opening 5. The pushing in of the tape rotates drum 6 and coils the tape thereabout. During the coiling, the spring pressed rollers 9, 10, and 11 press against the outer convolution of the coil and press the coil against the rollers 7 and 8, so that the incoming tape is confined in coiled formation about the drum. As the diameter of the coil increases, the rollers 9, 10, and 11 yield, and the drum 6 shifts away from rollers 7 and 8, as shown in Fig. 2. When the tape is coiled in the holder, it may be withdrawn by grasping the guard 24 and pulling the tape out of the holder, the rollers 9, 10, and 11 maintaining their confining pressure on the coil, or the button 20 may be pressed by the operator to move cam plates 18 and the rollers 9, 10, and 11, and release the confining pressure on the coil and permit the tape to project itself from the holder. When the pressure on button 20 is released, rollers 9, 10, and 11 are again pressed by their springs into confining engagement with the coil. If during a return of the tape to the holder, the tape for any reason does not coil tightly about the drum, or if for any other reason the pressure on the exterior coils of the tape is released without allowing one end of the tape to project from the holder thereby causing the coils to have rotational and radial movement with respect to the drum, the slack may be taken up by pressing the button 22 to prevent rotation of drum 6, and pulling outwardly on the tape to tighten it about the drum. Then the return of the tape to the holder may be resumed by pushing the tape into the holder.

The floating drum is particularly advantageous as it tends to equalize the pressure of the confining rollers by shifting in response to increases or decreases in the diameter of the coil, and thereby facilitates the coiling and uncoiling of the tape.

It will be understood that the invention is not to be limited to the specific embodiment shown for purposes of illustration, as the several inventive features thereof may be used to advantage in other forms and in various combinations.

I claim:

1. The combination of a ruler tape having the capacity and tendency when coiled, to uncoil; a holder therefor, including a floating drum, and releasable means to confine the tape in coiled formation on the drum, said means acting, in non-released position, as a brake to prevent the projection of the tape from the holder, and in a released position as a non-frictional support, to allow the tape to project from the holder, said releasable means including a plurality of rotatable members mounted on fixed axes and a plurality of releasable rotatable members mounted on movable axes.

2. The combination of a ruler tape, and a holder therefor including a drum, and means to confine the tape in coiled formation on the drum while permitting rotation thereof to coil or uncoil the tape, said confining means including a plurality of members rotatable about fixed axes and a plurality of releasable members rotatable about movable axes, the drum and tape coils being interposed between the first-named members and the releasable members, and the releasable members being spring-pressed toward the tape coils and the first-named members to confine to said drum the tape coiled thereabout and at the same time provide an antifrictional support for said drum and said tape.

3. In combination, a ruler tape having the capacity and tendency when coiled to uncoil, a holder therefor including a floating drum about which said tape may be coiled, and releasable means for controlling the action of said drum and tape coils, said releasable means when in a released position permitting rotation of the coils and drum while substantially preventing relative rotatable movement between said drum and the respective coils, said means also acting as a brake when in non-released position to prevent the projection of the tape from the holder, said releasable means including a plurality of members rotatable about fixed axes, and a plurality of members rotatable about movable axes.

4. The combination of a ruler tape having the capacity and tendency when coiled to uncoil, a holder therefor including a floating drum about which said tape may be coiled, and releasable means for controlling the operation of said drum and tape coils, said means when in a released position permitting rotation of the coils and drum while substantially preventing relative rotatable movement between said drum and the respective coils, said means also acting as a brake when in non-released position to prevent the projection of the tape from the holder, said releasable means including a plurality of members rotatable about fixed axes, and a plurality of releasable members rotatable about movable axes; and manually operable means for releasing said releasable members.

5. In combination, a ruler tape having the capacity and tendency when coiled to uncoil, a holder therefor including a floating drum about which tape may be coiled, and releasable means for controlling the action of said drum and tape coils, said means when in a released position acting as a non-frictional support of said coils and drum while substantially preventing relative rotatable movement between said drum and the respective coils of said tape, said means also acting as a brake when in non-released position to prevent the projection of the tape from the holder, said releasable means including a plurality of members rotatable about fixed axes, and a plurality of releasable members rotatable about movable axes, and resilient means for forcing said movable axes toward said drum; and manually operable means for counteracting the tendency of said resilient means.

6. In combination, a ruler tape having the tendency when coiled to uncoil and assume a straight-line position, a drum about which said tape may be coiled, a casing in which said drum and the tape coiled thereon may be housed, a plurality of members in said casing rotatable about fixed axes, a plurality of members rotatable about axes having lateral movement with respect to said casing, said members being located radially with respect to said drum, springs pressing the said members mounted on said movable axes toward said drum whereby relative movement of the drum with respect to the tape coiled thereabout is substantially prevented; and braking means mounted on said casing for preventing the movement of said drum with said coils, whereby said coils may be made to move with respect to the drum.

7. A pocket ruler comprising a ruler tape having the capacity and tendency when coiled to uncoil and assume a straight-line formation, a drum about which said tape may be coiled, a housing, a plurality of rollers mounted on fixed axes in said housing, a plurality of rollers mounted on movable axes in said housing, and oppositely disposed with respect to said first-named rollers, all of said rollers being radially positioned with respect to said drum, springs for forcing the said rollers mounted on movable axes toward said drum whereby said rollers confine said coils to said drum, means for counteracting the pressure of said springs whereby said coils and drum are non-frictionally guided with respect to said housing, and means for preventing rotation of said drum with respect to said housing without preventing the rotation of said coils with respect to said housing, whereby said coils may be wound tighter about said drum by manually pulling said tape from said housing while braking said drum.

8. A pocket ruler comprising a housing, a rotatable drum in said housing, a resilient metal ruler tape coilable on and uncoilable from said drum, said tape having the tendency when coiled to uncoil, control means including anti-friction means for contacting with the tape coiled on the drum for holding the tape and drum stationary within the housing, manually operable release mechanism for releasing said control means sufficiently to permit friction for rotation of the drum and tape coils to project the tape from the housing while holding the coiled portion of the tape against appreciable movement with respect to the drum.

FREDERICK O. CARLSON.